Figure 1:
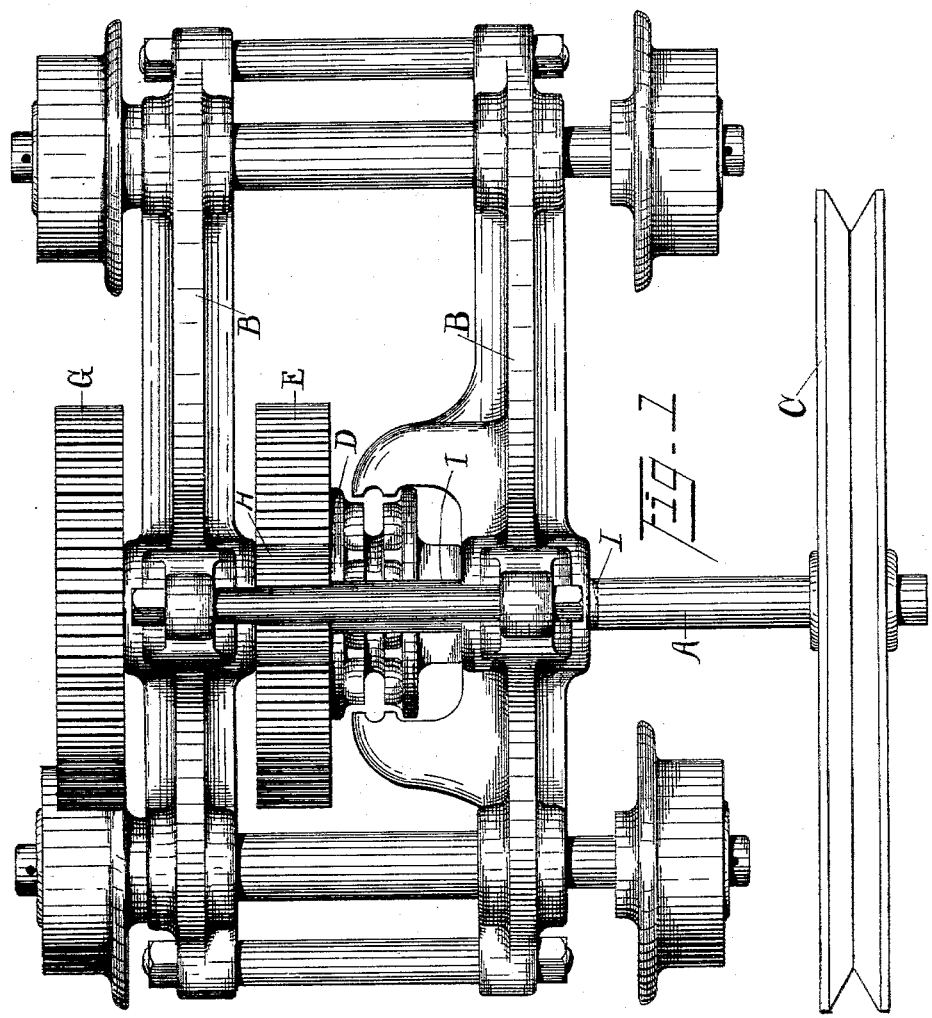

(No Model.)  2 Sheets—Sheet 1.

W. H. THOMPSON.
HOISTING APPARATUS.

No. 593,253. Patented Nov. 9, 1897.

Witnesses.
W. A. Biddle
H. Clark Ford

Inventor.
W. H. Thompson
by Burridge & Cutter

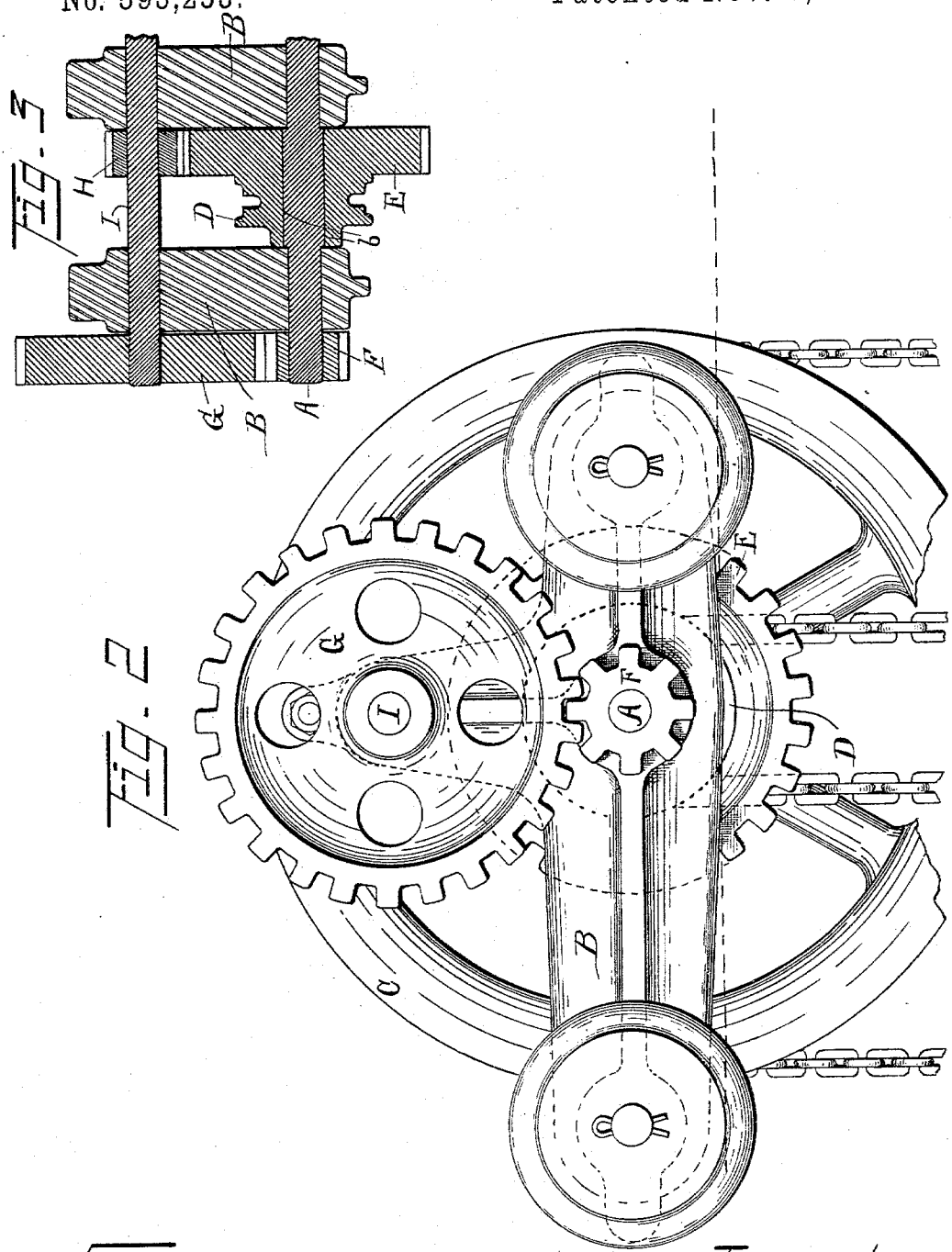

UNITED STATES PATENT OFFICE.

WILLIAM H. THOMPSON, OF CLEVELAND, OHIO.

HOISTING APPARATUS.

SPECIFICATION forming part of Letters Patent No. 593,253, dated November 9, 1897.

Application filed February 16, 1894. Serial No. 500,355. (No model.)

*To all whom it may concern:*

Be it known that I, WILLIAM HENRY THOMPSON, a citizen of the United States, and a resident of Cleveland, in the county of Cuyahoga and State of Ohio, have invented certain new and useful Improvements in Hoisting-Machines, whereof the following is a full, clear, and exact specification.

My invention relates to that general type of hoisting-machines wherein the power or driving wheel or shaft is geared down to such an extent that very large loads may be elevated by a winding shaft or drum by the application of a very small power, either manually or by steam, electric, or other power, to said driving-shaft.

The object of my invention is to produce a machine of this general type which shall be absolutely automatic in its braking action—that is to say, will not back down under stress of any load imposed upon the chain or equivalent connection which is wound upon the load-bearing shaft or drum. At the same time my invention seeks to reduce the number of parts and accordingly simplify the invention.

Heretofore machines of this kind have either employed a block-and-tackle connection with the load, so that the lifting-chain pulls vertically upon the load-bearing shaft and there is no tendency to unwind, or else when said load-bearing shaft or drum is employed to wind the chain or equivalent connection upon it a pawl or dog is employed to hold the machine against retrograde.

I have discovered that if the load-bearing member, a hollow shaft or drum, be mounted immediately upon the power-shaft while said drum or hollow shaft is back-geared to said power-shaft I obtain in hoisting apparatus a construction by which the weight of the suspended load is always automatically available to produce a frictional resistance or braking power sufficient to resist the tendency of the load to reverse or back down the hoisting-gear when released from its motive power, thereby holding the load suspended at any point desired without having to use any brake or other device requiring the special attention and manipulation of the operator.

The construction of my improved hoisting-machine will be fully understood upon reference to the accompanying drawings, in which—

Figure 1 is a plan of a machine embodying my invention. Fig. 2 is a side view of the same. Fig. 3 is a vertical section, on a reduced scale, taken through the shafts.

A represents a power-shaft which may be mounted in any suitable frame or mounting B B and which may be driven by any suitable means—for example, a wheel C.

The load-bearing member D is mounted directly upon the driving-shaft A and in frictional contact therewith. I have illustrated this member as a common form of chain-wheel, which will wind up a chain to one side of which the load is attached.

While not essential to my invention, the shaft A may have an enlargement $b$ between its bearings to retain the shaft in place and to afford an enlarged bearing for the load-bearing member D, which has turning bearing directly upon said power-shaft.

The load-bearing member D is back-geared to the power-shaft A through the large gear-wheel E, fixed relatively to said member D, (for convenience cast integrally with it,) the small gear-wheel H, fixed upon a counter-shaft I, which also carries and is rotated by a large gear-wheel G, which meshes with a small pinion F, keyed to the power-shaft.

From the obvious relations of the parts of this back gearing it will be readily understood that when the shaft A is rotated power applied thereto is multiplied so largely at the expense of motion that a very great winding force is transmitted to the load-bearing member D; but tendency of said member D to unwind under stress of any load supported by one side of its chain will be so reduced in power which it exerts upon the power-shaft that it will amount to comparatively little.

I find in practice by mounting the member D directly upon and in frictional contact with the power-shaft A, which must be turned at a comparatively rapid rate by the slightest movement of member D, that the friction between these two parts is in excess of any turning or running-down tendency which can be transmitted to shaft A through the back gearing, and the apparatus becomes instantly and automatically locked whenever and wherever the turning-power is withdrawn from shaft A.

While the device has features which are common to hoisting-machines operated by a system of compound gearing proportioned to obtain the desired power, speed, &c., it has also, in accordance with the object of my invention as herein set forth, an additional feature heretofore entirely unknown in connection with hoisting-gearing, which feature is the capacity to hold a load suspended at any point desired without the assistance of a brake or other separate device for preventing a reversal of the gear under the influence of the load, as in the ordinarily-constructed hoisting apparatus. Moreover, the weight of the suspended load is automatically made available to produce this capacity to hold the load suspended as desired. Further, the frictional resistance made available for braking the power-shaft is obtained solely by mounting upon the power-shaft the hoisting-drum and is explained by the fact that the quick-moving and most sensitive power-shaft has to sustain the whole load put upon the machine, whereby an excessive and abnormal degree of frictional turning resistance is imposed on the said power-shaft, and this is much greater than can be overcome by the reversing tendency of the load being sustained.

Having thus described my invention, what I claim as new therein, and desire to secure by Letters Patent, is—

In a hoisting-machine, the combination of a suitable frame or mounting, a power-shaft having bearing in said frame or mounting, a load bearing or hoisting member mounted directly upon and in frictional contact with the power-shaft, to one side of the bearing of said shaft in the frame or mounting, and back gearing substantially as described making turning connection between the hoisting member and the power-shaft so as to cause said load bearing or hoisting member to be turned by the power-shaft in either direction, but to cause said hoisting member to automatically bind the power-shaft against rotation and thereby lock itself against retrograde movement under influence of a load, as explained.

In testimony whereof I affix my signature in presence of two witnesses.

WILLIAM H. THOMPSON.

Witnesses:
F. A. CUTTER,
L. A. STRATTON.